Patented Mar. 20, 1928.

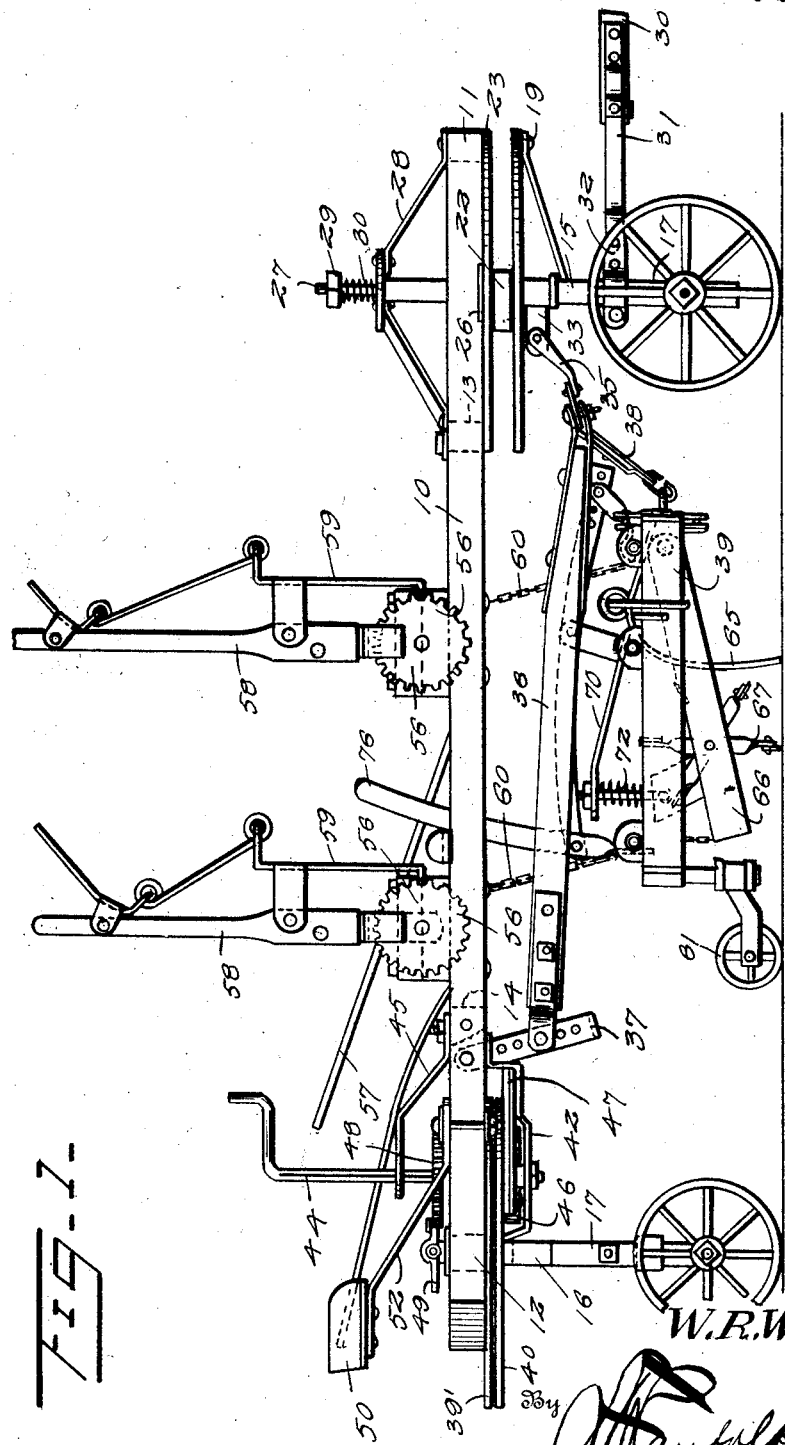

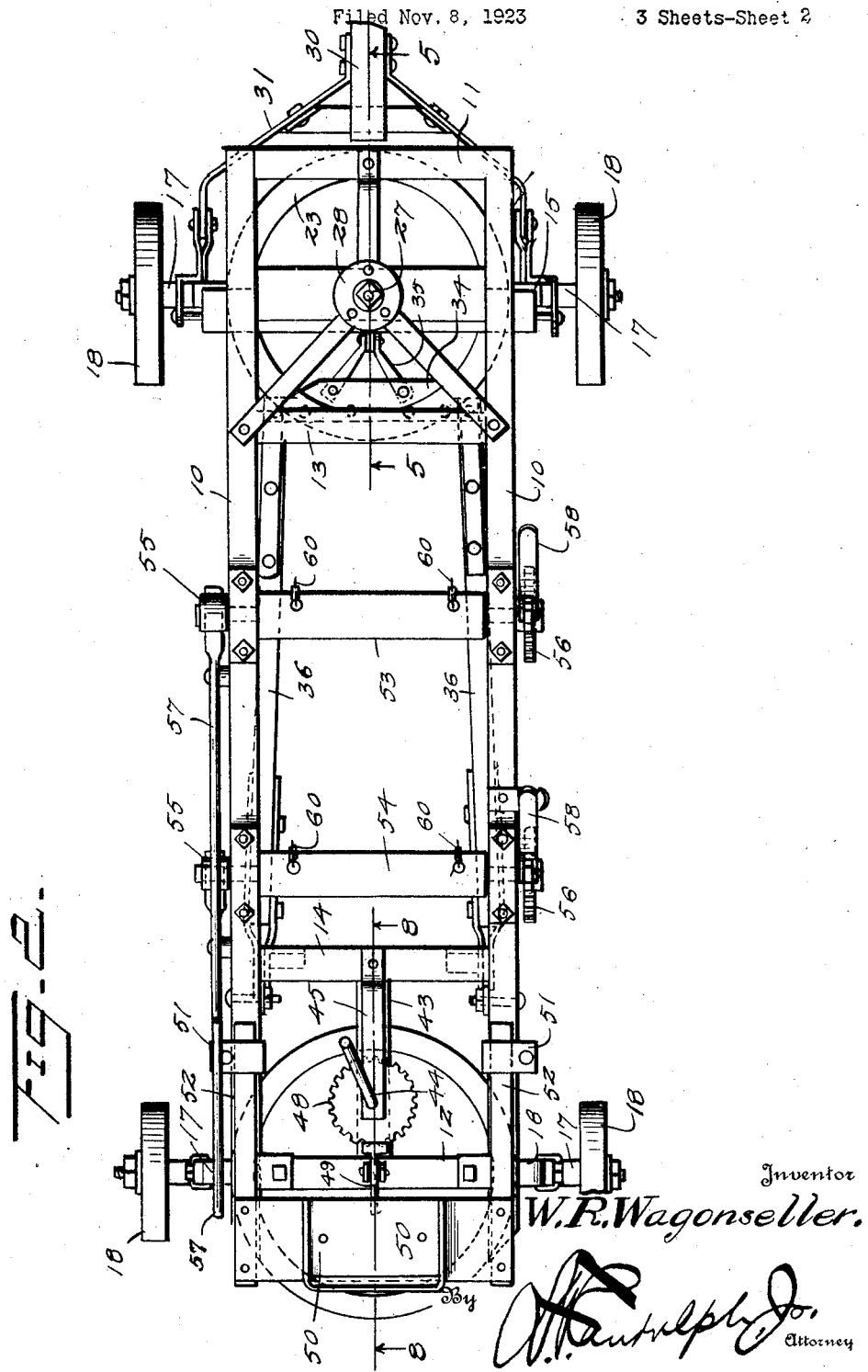

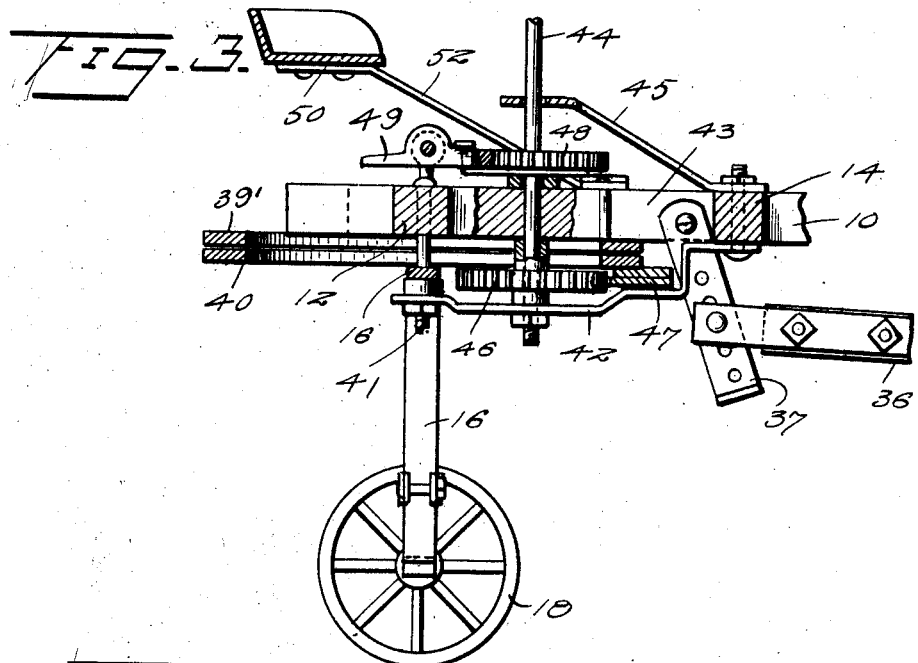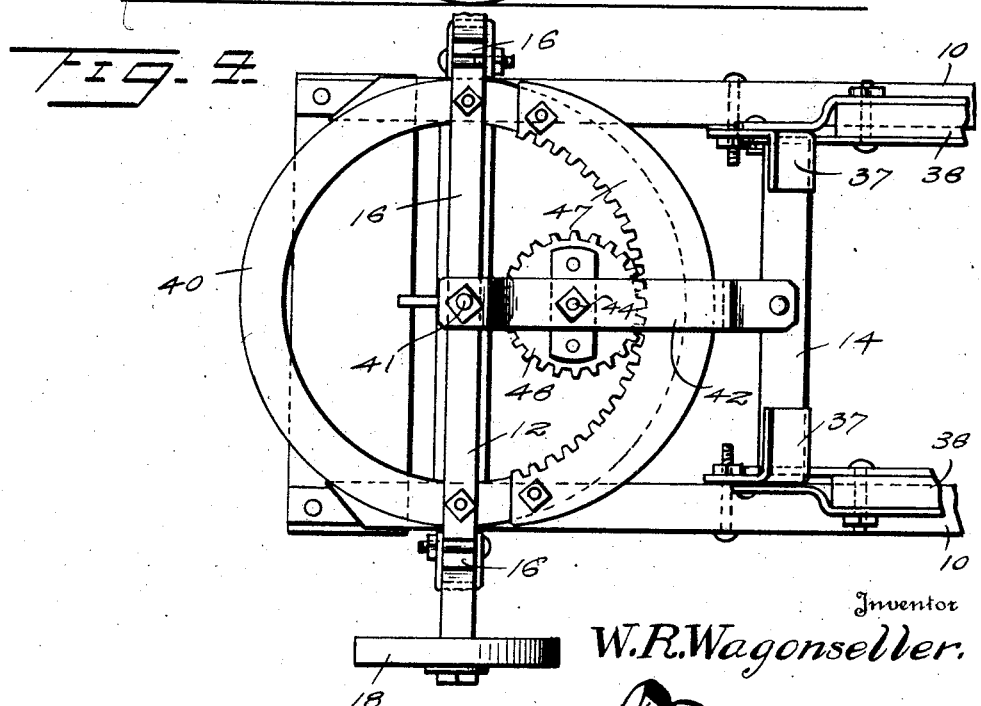

1,663,361

UNITED STATES PATENT OFFICE.

WILLIAM R. WAGONSELLER, OF MONTAGUE, TEXAS.

DIRIGIBLE AXLE FOR AGRICULTURAL IMPLEMENTS.

Application filed November 8, 1923. Serial No. 673,581.

The principal object of the present invention is the provision of a wheel frame which, in conjunction with adjunctive parts, may be utilized as a cultivator, harrow, stalk cutter or three-row corn and cotton planter, the implement being illustrated in the present instance in conjunction with a stalk cutter, the atter however being replaceable by a harrow, a cultivator, or planting mechanism, as required.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a side view showing the invention in conjunction with a stalk cutter, Figure 2 is a top plan view of the wheel frame embodying the invention with the stalk cutter omitted, Figure 3 is an enlarged sectional view on the line 8—8 of Figure 2.

Figure 4 is a bottom plan view of the parts shown in Figure 3.

Corresponding and like parts are referred to in the following description and designated in the several views of the drawings by like reference characters.

The wheel frame, constituting the essential feature of the present invention, comprises a running gear and a bed mounted thereon, said bed including longitudinal bars 10, front and rear cross bars 11 and 12, respectively, and intermediate cross bars 13 and 14. The running gear embodies a front axle 15 and a rear axle 16, each of said axles being of arch form. L-shaped brackets 17 are secured in any preferred way to the vertical members of the front and rear axles and their outwardly disposed spindle arms receive wheels 18. The axles 15 and 16 are mounted to turn about vertical axes so that the implement may be turned in a relatively small space.

A ring 19 is connected at diametrically opposite points to the axle 15. Cross pieces 20 and 21 are disposed between the axle and ring and are separated by spacers. A bolster 22 rests upon the ring 19 and supports a companion ring 23 which is attached to the cross bars 11 and 13 and the side bars 10. A front brace 24 connects the axle 15 with the ring 19 and lateral braces 25 connect the vertical members of the axle with the horizontal member. A cross piece 26 is interposed between the ring 23 and side bars 10 and is connected at its ends thereto. A vertical pivot 27 connected at its lower end to the axle 15, passes through openings formed in the cross pieces 20, 21 and 26 and through a spider 28 and its upper end is threaded to receive a nut 29 and a helical spring 30, the latter being confined between the nut 29 and spider 28. A pole or tongue 30 is connected by hounds or straps 31 with clamps 32 applied to the vertical members of the axle 15 and the brackets 17 connected thereto. It will thus be understood that the clamps 32 also serve as fastening means for the brackets 17, as well as connecting means for the hounds or straps 31.

A hitch 33 is mounted upon the pivot 27 intermediate the cross pieces 20 and 21. A draft bar 34 is connected to the hitch 33 by means of links 35 and this draft bar is provided at intervals in its length with openings for adjustable connection therewith of longitudinal bars 36 which have adjustable connection at their rear ends with pedals 37 pivotally connected at their upper ends to the side bars 10. It will thus be understood that the longitudinal bars 36 are adjustable laterally at their front ends and vertically at their rear ends. Links 38 have adjustable connection at their front ends with the draft bar 34 and are adapted to cross and are connected at their lower rear ends to the frame 39 of a cotton chopper.

A ring 39' is secured at diametrically opposite points to the side bars 10 and coacts with a ring 40 which is secured to the axle 16. These two rings constitute a fifth-wheel connection between the rear axle 16 and the bed of the structure. A pivot 41 supported in the cross piece 12 extends through the axle 16 and a strap 42 connects the lower end of the pivot 41 with the cross bar 14. A short longitudinal bar 43 is connected at its ends to the cross bars 12 and 14 and supports a vertically disposed shaft 44 which is mounted at its lower end in the strap 42 and in a brace 45 secured to the cross bar 14. A gear wheel 46 fast to the lower end of the shaft 44, is in mesh with a toothed plate 47 attached to the ring 39', hence rotation of the shaft 44 effects a turning of the ring 40 and the axle 16 attached thereto. A toothed wheel 48 fast to the shaft 44 is adapted to be engaged by a dog 49 mounted upon the pivot 41, whereby to hold the shaft 44 and the axle 16 in the required adjusted position. The dog 49 is conveniently disposed to be operated by the foot of the driver mounted upon a seat 50 which is adjustably connected with the side bars 10 by means of clamps 51 engaging arms 52 extending from the seat.

What is claimed is:

1. In an agricultural implement, a carrying frame including a bed and arch-shaped axle, coacting rings one on said bed and one on the bight of said axle forming a fifth wheel connection, a cross member on and within the vertical confines of said bed forwardly of the rings, an upstanding shaft surrounded by the rings extending above and below the bed, brackets extending rearwardly from said cross member one above and one below said bed, said shafts being journaled in said brackets, a pivot member extending from the bed through the rings, said axle and lower bracket, an element on the lowermost ring having a concave toothed surface, a gear on said shaft below the bed in engagement with said toothed surface, a detent plate on said shaft between the uppermost bracket and said bed, and a detent adjacent the detent plate for coaction therewith.

2. In an agricultural implement, a carrying frame including a bed and an arch-shaped axle, coacting rings one on said bed and one on the bight of said axle forming a fifth wheel connection, an upstanding shaft surrounded by the rings extending above and below the bed, a bracket extending from the bed and disposed below the same, said shaft being journaled in said bed and in said bracket, a pivot member extending from the bed through the rings, said axle and said bracket, the lowermost ring having a concave toothed surface, a gear on said shaft below the bed in engagement with said toothed surface, a detent plate on said shaft between the uppermost bracket and said bed, and a detent adjacent the detent plate for coaction therewith.

In testimony whereof I affix my signature.

WILLIAM R. WAGONSELLER.